United States Patent
Stanforth et al.

(10) Patent No.: US 9,813,914 B2
(45) Date of Patent: Nov. 7, 2017

(54) SYSTEM AND METHOD FOR MANAGEMENT OF SPECTRUM INTERFERENCE RIGHTS AND SECONDARY USE PERMISSIONS

(71) Applicant: QUALCOMM Incorporated, San Diego, CA (US)

(72) Inventors: Peter Stanforth, Winter Springs, FL (US); Jeffery C. Schmidt, Orlando, FL (US)

( * ) Notice: Subject to any disclaimer, the term of this patent is extended or adjusted under 35 U.S.C. 154(b) by 0 days.

(21) Appl. No.: 14/547,413

(22) Filed: Nov. 19, 2014

(65) Prior Publication Data

US 2015/0163671 A1 Jun. 11, 2015

Related U.S. Application Data

(60) Provisional application No. 61/912,582, filed on Dec. 6, 2013.

(51) Int. Cl.
*H04W 48/04* (2009.01)
*H04W 16/14* (2009.01)

(52) U.S. Cl.
CPC ............ *H04W 16/14* (2013.01); *H04W 48/04* (2013.01)

(58) Field of Classification Search
CPC .............................. H04W 16/14; H04W 48/04
USPC ....... 455/411, 454, 443, 444, 447, 455, 464, 455/423; 370/329; 725/62
See application file for complete search history.

(56) References Cited

U.S. PATENT DOCUMENTS

| | | | |
|---|---|---|---|
| 8,279,823 B2 | 10/2012 | Stanforth | |
| 8,325,621 B2 * | 12/2012 | Simonsson | ........... H04W 52/40 370/252 |
| 8,532,686 B2 | 9/2013 | Schmidt et al. | |
| 2006/0083205 A1 | 4/2006 | Buddhikot | |
| 2007/0079337 A1 * | 4/2007 | Vincent | ........... H04H 20/67 725/62 |
| 2008/0231449 A1 | 9/2008 | Moshfeghi | |

(Continued)

FOREIGN PATENT DOCUMENTS

| | | | |
|---|---|---|---|
| WO | 2014/124131 A2 | 8/2014 | |
| WO | WO 2014124131 A2 * | 8/2014 | ........ H04W 72/1215 |

OTHER PUBLICATIONS

International Search Report and Written Opinion from corresponding International Application No. PCT/US2014/068775 dated Mar. 2, 2015.

*Primary Examiner* — Kamran Afshar
*Assistant Examiner* — Farid Seyedvosoghi
(74) *Attorney, Agent, or Firm* — Qualcomm IP Dept.; James Hunt Yancey, Jr.

(57) ABSTRACT

Granting interference rights to a secondary spectrum user that has a need for spectrum access to carry out wireless communications includes receiving a spectrum access request from the secondary user and determining a primary user that has a protected use area that overlaps with a secondary use area of the secondary user. A quantified predicted amount of interference that operation of the secondary user has on the primary channel of the primary user is determined and spectrum access to a primary channel of the primary user under interference rights is authorized if the quantified predicted amount of interference has less than a predetermined amount of effect on the primary channel of the primary user. The spectrum access is communicated to the secondary user.

20 Claims, 5 Drawing Sheets

(56) References Cited

U.S. PATENT DOCUMENTS

| | | | |
|---|---|---|---|
| 2009/0215457 A1 | 8/2009 | Wang | |
| 2009/0323619 A1* | 12/2009 | Tajer | H04W 72/08 370/329 |
| 2010/0075704 A1 | 3/2010 | McHenry | |
| 2010/0173587 A1 | 7/2010 | Gan | |
| 2010/0197317 A1 | 8/2010 | Sadek et al. | |
| 2012/0120887 A1* | 5/2012 | Deaton | H04W 16/14 370/329 |
| 2012/0238218 A1* | 9/2012 | Stine | H04W 16/00 455/67.11 |
| 2012/0307782 A1 | 12/2012 | Kang | |

* cited by examiner

SYSTEM AND METHOD FOR MANAGEMENT OF SPECTRUM INTERFERENCE RIGHTS AND SECONDARY USE PERMISSIONS

RELATED APPLICATION DATA

This application claims the benefit of U.S. Provisional Patent Application No. 61/912,582, filed Dec. 6, 2013, the disclosure of which is herein incorporated by reference in its entirety.

TECHNICAL FIELD OF THE INVENTION

The technology of the present disclosure relates generally to wireless communications and, more particularly, to a system and method for making licensed spectrum available to secondary users through interference rights.

BACKGROUND

Spectrum sharing is thought of as one of the most viable ways of improving the amount of spectrum available to wireless networks and other radio devices for conducting wireless communications. An exemplary spectrum sharing technique involves use of television white spaces under regulations set forth by an appropriate regulatory agency. An exemplary regulatory agency that regulates the use of wireless spectrum is the U.S. Federal Communications Commission (FCC). Other countries may have similar regulatory entities.

In the U.S., for example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space (or TVWS) but other types of white spaces are possible. In the case of TV white space, the white space is comprised of unused spectrum that is interleaved with spectrum used by incumbent radio devices in the channel 2 to channel 51 range (corresponding to 54 MHz to 698 MHz). Exemplary incumbent radio devices for TV white space include television broadcasters and other priority users of television channels. Under FCC regulations, for example, radio devices that use TVWS must register with a central database server (also referred to as a spectrum management server) and receive a channel list (also referred to as a channel map) of available channels for which the radio device may use in a shared environment with other TV band devices (TVBDs). The channel list that is generated for a radio device is generated by the central database server based on the location of the radio device. In this manner, the operation of incumbent radio devices having protected areas in which the radio device is located may be taken into account when determining channel availability.

Also, regulators and industry groups have proposed the use of geo-location database technology to control or manage spectrum access for radios in other situations. For example, use of geo-location database technology has been proposed for the 5 GHz UNII bands and for the 3.550 GHz to 3.650 GHz bands in which the U.S. government and military are incumbent users.

Outside the U.S., use of geo-location database technology has been proposed for TVWS bands in a number of countries. In the European Union (EU), TVWS sharing is often referred to as authorized shared access (ASA) and/or licensed shared access (LSA). Exemplary regulations for ASA/LSA are outlined in European Telecommunications Standards Institute (ETSI) EN 301 598. Other standards bodies have also proposed mechanisms for supporting spectrum sharing, such as the Internet Engineering Task Force's (IETF) Protocol to Access White Space (PAWS).

A concern expressed by the operators of incumbent radio devices is how incumbent spectrum use will be protected from the potential effects of interference by TVBDs. The solution of choice is a geo-location database (e.g., the above-noted central database server) that is capable of managing the allocation of spectrum in accordance with policies defined in terms of geography, time, frequency and other parameters, such as transmit power and emissions characteristics.

Television broadcasters are just one type of protected spectrum user and this protection is by virtue of a spectrum license. Licenses are issued for a variety of other spectrum segments, typically defined by location, time, frequency and operating characteristics (e.g., antenna height, transmit power, etc.). Therefore, other incumbent devices that are entitled to interference-free use of spectrum include devices operating under regulatory license. Often, the license owners have paid substantial sums for the license. Other protected entities may include users that are part of the government or defense department.

Some incumbent users, however, may be willing to share spectrum if operations of in the incumbent user are not negatively affected or if financial compensation is made.

To date, the coordination of spectrum sharing arrangements for protected spectrum (e.g., licensed frequencies) has been a very tedious process that involves detailed human involvement.

DETAILED DESCRIPTION OF EMBODIMENTS

Figure 1:
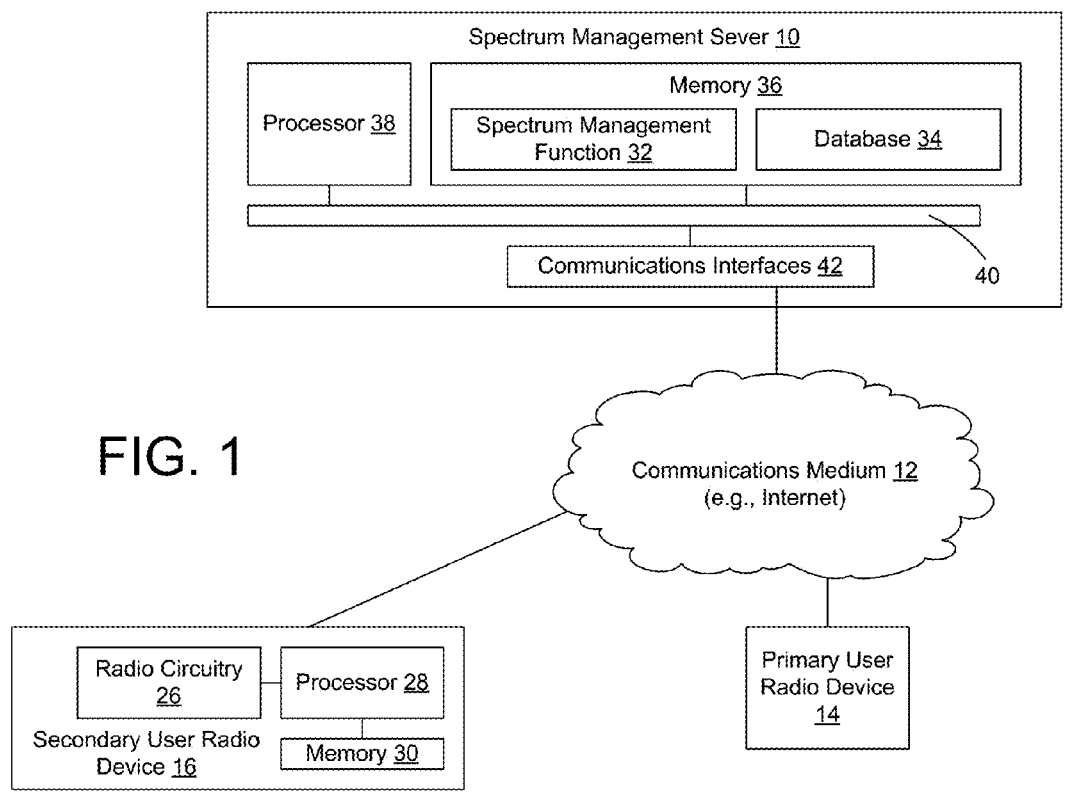
FIG. 1 is a schematic view of an exemplary system for making licensed spectrum available to secondary users through interference rights.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Introduction

The following disclosure describes techniques for automating the sharing of protected spectrum while minimizing the potential for harmful radio frequency (RF) interference to the protected radio devices.

With initial reference to FIG. 1, spectrum sharing is accomplished through the use of a centralized spectrum management server 10. The spectrum management server 10 is sometimes referred to as a "geo-location database." The spectrum management server 10 is accessible via a communications medium 12 (e.g., the Internet) by protected parties and unlicensed parties. An exemplary protected party is a licensed, primary spectrum user radio device 14. An exemplary unlicensed party is a secondary spectrum user radio device 16. Typically, the secondary user 16 communicates with the server 10 to seek spectrum access in the form of access credentials to spectrum that are provided in an electronic format. A protected party also may be referred to as a primary user or protected radio, and an unlicensed party also may be referred to as a secondary user or secondary radio. Using a predictive approach, the spectrum management server 10 is configured to determine the potential for interference by a requesting secondary radio device 16 on the operation of one or more protected users 14.

For purposes of description, a primary user 14 refers to a licensed spectrum user that has a protected use area defined under the license. The protected use area is typically identified by a contour that is determined arbitrarily, geographically, empirically or mathematically using a propagation model. It will be understood that there may be other radio systems operating in the protected use area as receivers of a signal from the primary user 14 and/or as spectrum users (e.g., transmitters) under the same license that protects the primary user 14. These other radios may be considered protected devices, but the primary user 14 defining the protected use area will be system considered for purposes of the techniques described herein.

Figure 2:
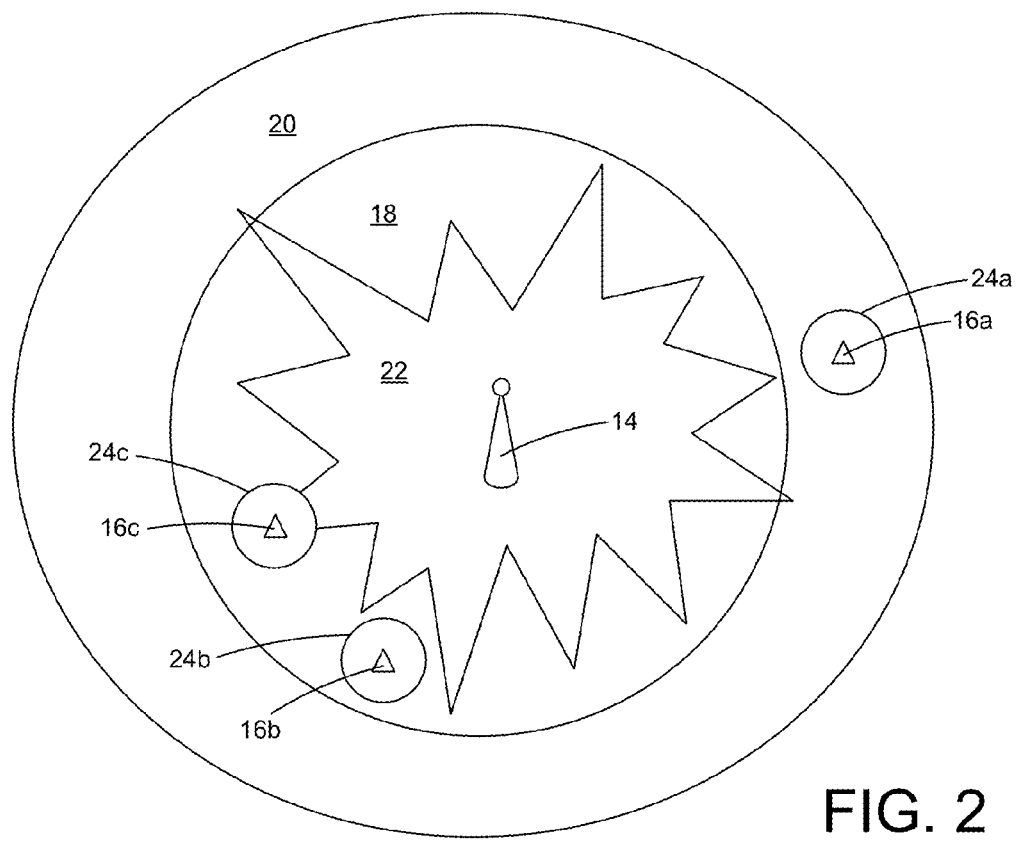
FIG. 2 is a schematic view of a representative spectrum environment for a primary user in which a secondary user may operate.

With additional reference to FIG. 2, shown is schematic view of a representative spectrum environment for a primary user 14 in which a secondary user 16 may operate. As such, FIG. 2 depicts the general concept of spectrum sharing on a secondary basis in which one or more secondary radios 16 are granted access to spectrum on a non-interfering or minimally-interfering basis with respect to primary users 14.

In FIG. 2, three contours (also referred to as areas) relating to a primary user 14 are shown. These contours represent different types of protected use areas for the primary user 14. The contours are respectively labeled as contour 18, 20 and 22. Contour 18 is an operating or protected area defined by a path loss model or regulator defined (FCC) license area (e.g., an R-6602 grade B television contour). Contour 18 also may be referred to as a licensed coverage area 18, or protected area 18. Contour 20 is an interference protection contour that extends beyond the licensed coverage area 18. Contour 20 is intended to prevent other users from operating near the protected area 18 to keep interference from "bleeding" into the licensed (protected) area 18. Contour 22 is the actual operating contour (actual coverage) of the primary user 14 resulting from emissions from the radio equipment of the primary user 14. It is possible that two or more of the areas 18, 20 and 22 are equivalent in some systems, or that the primary user 14 is associated with fewer than or more than three contours.

In FIG. 2, also shown are three exemplary secondary users 16a, 16b and 16c. Each secondary user 16a, 16b and 16c has a respective coverage area (labeled as 24a, 24b and 24c). The coverage areas 24a, 24b and 24c each have varying degrees of overlap with the contours 18, 20 and 22. The secondary use areas 24a, 24b and 24c may create varying degrees of potential interference to the primary operation of the primary user 14. Area 24a overlaps with contour 20 and, of the three areas 24a, 24b and 24c, is the least likely to impact the primary user 14. Area 24b overlaps with contours 18 and 20 and has a higher likelihood of impacting the primary user 14 than emissions by secondary user 16a in area 24a. Area 24c overlaps contours 18, 20 and 22 and, of the illustrated secondary user areas 24a, 24b and 24c, has the highest likelihood of impacting the primary user 14.

Under current FCC rules, a secondary user 16 is typically not allowed to have co-channel operations with a primary user 14 within a protected use area of the primary user 14. While this mitigates the potential for interference to the incumbent (primary) user 14, this protection technique typically establishes unneeded areas of unused spectrum by protecting areas that are not actually used by the primary user 14.

But to permit secondary use within an ordinarily protected contour (e.g., permit secondary use in areas 18, 20 and/or 22), the primary user 14 will want an assurance that interference to the operations of the primary user 14 will not exceed a tolerance level. In some instances, the tolerance level is a zero tolerance level. The techniques described in this document quantify the potential interference from the secondary user 16. The quantification may be performed by the central spectrum management server 10. The quantification may be used to inform the primary user 14 of the amount of potential interference. Using this data, the primary user 14 may approve or deny the secondary use. In this embodiment, the approval or denial of the secondary use may involve human action. Alternatively, the approval or denial of the secondary use may involve an automated action by an electronic device of the primary user 14 that is capable of executing logical instructions. In addition to the quantification of potential interference, the primary user 14 in both the manual and automated embodiments, may also consider other factors when making the approval/denial decision. One additional factor that may be considered is opportunity cost of allowing the secondary use. For example, if the secondary user 16 is willing to pay for the secondary spectrum use, then this may influence the decision of the primary user 14.

In another embodiment, the quantification may be compared to a predetermined tolerance level and/or other predetermined parameters by the central spectrum management server 10 and the central spectrum management server 10 may approve the secondary use in an automated manner.

If the secondary use is approved, then the secondary user 16 may be given permission to operate on the primary channel of the primary user 14. Limits on the use by the secondary user 16 may be imposed, such as a geographic contour or area of use, a transmit power limit, a time frame, a permitted frequency range or channel, a modulation scheme, etc.

Granting a secondary user 16 access to the spectrum of an incumbent user 14 is sometimes described as interference rights. In conventional practice, interference rights are rarely relied upon and are not widely used because the mechanisms to obtain interference rights are complex and are typically implemented in a manual fashion and not in real-time.

To implement the wide-scale use of interference rights and, in some cases, automate the granting of interference rights, the disclosed techniques include identifying and/or quantifying the interference created by the secondary user 16. In some embodiments, the disclosed techniques also include placing a fair economic or monetary value on the interference created by the secondary user 16. This value may be an amount that the secondary user 16 pays the primary user as consideration for spectrum access.

The value of automating the granting of interference rights may be understood through the description of an example using TV White Space (TVWS). It will be appreciated that the description in the context of TVWS is exemplary. The principles and concepts apply to all spectrum bands that may be shared and made available for secondary use. TVWS is a good example for purposes of description because the value of this unlicensed spectrum is relatively low when compared to licensed spectrum. Therefore, until the mechanisms and processes are automated there is little incentive to try to implement secondary use models because the cost of determining the potential interference far exceeds the value of opportunistic spectrum use.

In a prophetic example, suppose a national chain of stores or restaurants desires to deploy an unlicensed content distribution system within each of its locations and desires to use a solution based on TVWS (e.g., unlicensed UHF spectrum). The decision to employ TVWS may be made since TVWS is spectrum that is available at minimum or no financial cost. But it may be found that at some of the locations, particularly locations in densely populated urban areas, there may be no TVWS available due to the presence of incumbent users or the available TVWS is congested with other TVWS users. The disclosed techniques may be used to assist in finding useable spectrum in the locations without reliable TVWS. It will be recognized, however, that the disclosed techniques have application in a variety of other circumstances. Therefore, the following description is made in the context of granting interference rights to a secondary user having radio equipment at a single identifiable location. The techniques may be repeated for many locations or many secondary users.

B. Granting Interference Rights

Figure 3:
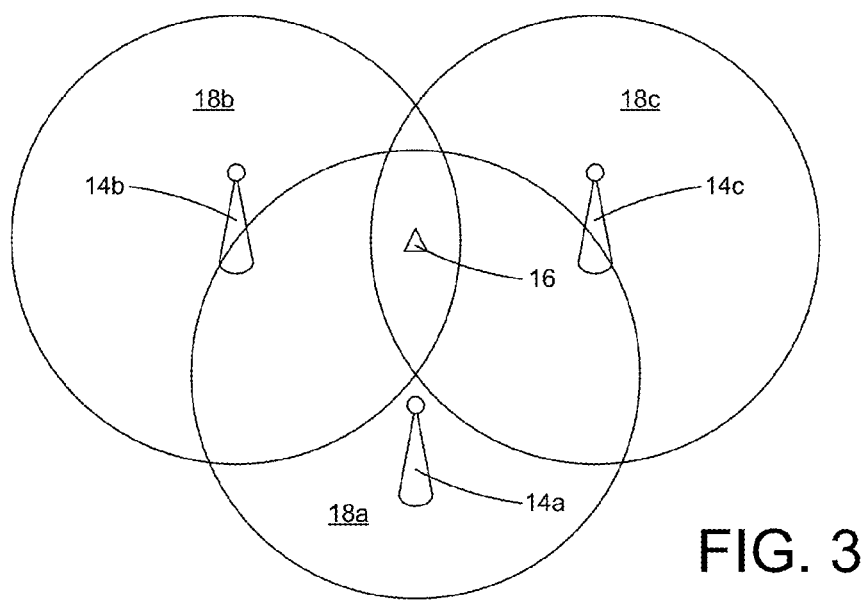
FIG. 3 is a schematic view of a representative spectrum environment for a secondary user.

With additional reference to FIG. 3, shown is a schematic view of a representative spectrum environment for a secondary user 16. The secondary user is located is within the protected boundaries 18*a*, 18*b* and 18*c* of three incumbent users 14, labeled respectively as incumbent 14*a*, incumbent 14*b* and incumbent 14*c*. Each incumbent user 14 in this example has a TV broadcast license. The primary channel of each incumbent user 14 may be different. Through inference rights, the primary channel of one or more of the incumbent users 14 may be used by the secondary user 16 under the disclosed techniques. The techniques may include quantifying and limiting interference from the secondary user 16 to an acceptable level. In some embodiments, a price or cost to use the spectrum is imposed on the secondary user 16 and one or both of the primary user 14 or the secondary user 16 may be given the opportunity to accept or decline the secondary use based on reasonableness of the price of use or other criteria.

The process of providing the secondary user 16 with interference rights has similarities to the registration process of a TV band radio device (TVBD) to acquire a channel list for TVWS. In the TVWS registration process, a server hosts a website or automated service that allows a human user or a radio device to make a TVWS spectrum usage request (also referred to as a TVWS registration request).

In one embodiment of providing interference rights, if the server 10 receives a TVWS registration request, the request is processed to provide a TVWS channel list to the requesting device and is processed to provide one or more interference rights options to the requesting device, if one or more interference rights options are available. In other embodiments, a TVWS registration request is processed to provide only a TVWS channel list to the requesting device and interference rights options are only evaluated if no TVWS is available or upon receipt of a separate interference rights request from the radio device. Spectrum access requests, as used herein, includes TVWS registration requests, interference rights requests and other similar forms of requests for spectrum access.

In this description, reference to a radio device of the secondary user 16 will be understood to refer to the radio equipment of the secondary user 16, which may include one radio-based transceiver or multiple radio-based transceivers.

An interference rights request sent from the requesting radio device of the secondary user 16 to the server 10 may include one or more of the following data items and any other appropriate data items:

Information to identify the secondary user 16, such as contact information, an entity identifier already obtained from the server, etc. Alternatively, a unique identifier for the radio device of the secondary user 16, such as an FCC ID, may be used.

Location of operation, such as a geo-location identification having accuracy within a predetermined tolerance (e.g., fifty meters).

Characteristics of operation (e.g., indoor or outdoor operation, transmit power level, antenna gain and height, etc.).

Number of channels (or bandwidth) required or desired. Preferred channels also may be identified.

Radio device type and, if more than one radio-based apparatus, the number of devices.

Wireless application (e.g., video content broadcast, Internet access for others, etc.)

In other embodiments, the data to generate a TVWS registration request or an interference rights request is manually entered into a webpage hosted by the server 10.

The interference right request may be made apart from a white space channel map request. In this case, the server 10 may return access credentials for the channel(s) of a primary user 14. In other embodiments, the server 10 may treat white space channel map requests as including an interference right request and return channel availability results with both unlicensed channels and channels licensed to primary users 14.

Once the interference rights request is made by the secondary user 16 and received at the server 10, the server 10 utilizes a propagation model to determine the impact of secondary use to the primary channel of the primary user 14. If the impact is acceptable, the sever 10 grants spectrum access to the secondary user 16 in the form of interference rights. These operations will be described in greater detail below. The following description describes the analysis in connection with one primary user 14 (e.g., an analysis of one primary channel). But the analysis may be repeated for multiple primary users 14 (e.g., an analysis of multiple primary channels) to find one or more suitable channels for which the secondary user 16 may be granted interference rights. If plural solutions are determined, the secondary user 16 may be permitted to select one or more of the available protected channels based on preferences, performance expectations, cost, or other considerations. Alternatively, the server 10 may make a selection for the secondary user 16 based on one or more considerations that are preselected by the secondary user 16, based on a prioritization scheme, or using other considerations.

The server 10 may identify channels that are licensed to primary users 14 in the location of the secondary user 16. Some of these channels serve as candidates for use by the secondary user 16 under interference rights. As will be described, each candidate channel is evaluated to determine if the potential effect on radio operations to the primary user 14 and radios receiving a signal from the primary user 14 is below an acceptable level. In one embodiment, the candidate channels are channels for which associated primary users 14 in the location of the secondary user 10 have pre-authorized secondary users 16 to operate using interference rights. The primary user 14 may pre-authorize the server 10 to grant interference rights to a secondary user 16 by completing an authorization routine. In this embodiment, the following analysis is carried out for one or more of the channels identified as being pre-authorized. In another embodiment, or if no pre-authorized channels are identified, the server 10 conducts the following analysis for channels associated with primary users 14 that have not pre-authorized interference rights. In this case, authorization from the primary user 14 may be required prior to use of the corresponding primary channel by the secondary user 16.

Evaluation of the secondary user's effect on the primary channel of the primary user 14 will now be described. This evaluation is carried out in a predictive manner. That is, the evaluation is done by predicting the effect on the spectrum environment that presence of the secondary user 16 would have if the secondary user 16 were to use the spectrum licensed to the primary user 14. When conducting this analysis, the server 10 determines the impact of secondary use to the primary channel by applying an RF propagation model to quantify the induced rise in the noise floor caused by radiated emissions from radio device(s) of the secondary user 16 if the device(s) were to be deployed in the location specified in the request.

As part of the analysis, the server 10 determines information about the incumbent service or coverage area of the primary user 14. This information may be obtained from a database containing coverage data and/or may be determined using a propagation model. In one embodiment, the server 10 uses information about the primary user 14 to determine induced noise floor caused by operation of the primary user 14. Therefore, two information sets result, including the predicted induced rise in the noise floor caused by radiated emissions from the proposed secondary user device 16 and information about the incumbent service (e.g., coverage area and/or transmission characteristics of the primary user 14), which in some embodiments may be in the form of induced noise floor caused by operation of the primary user 14. The two information sets are analyzed and/or combined to determine the impact of secondary operations on incumbent operations and performance.

Using the two information sets, the server 10 determines the impact of secondary operations on incumbent operations and performance. The impact may be quantified in one or more ways. For instance, the impact may be quantified in terms of total induced noise floor, degradation to signal-to-noise ratio (SNR), and/or loss of service to incumbent operations in specific geographic areas.

Figure 4:
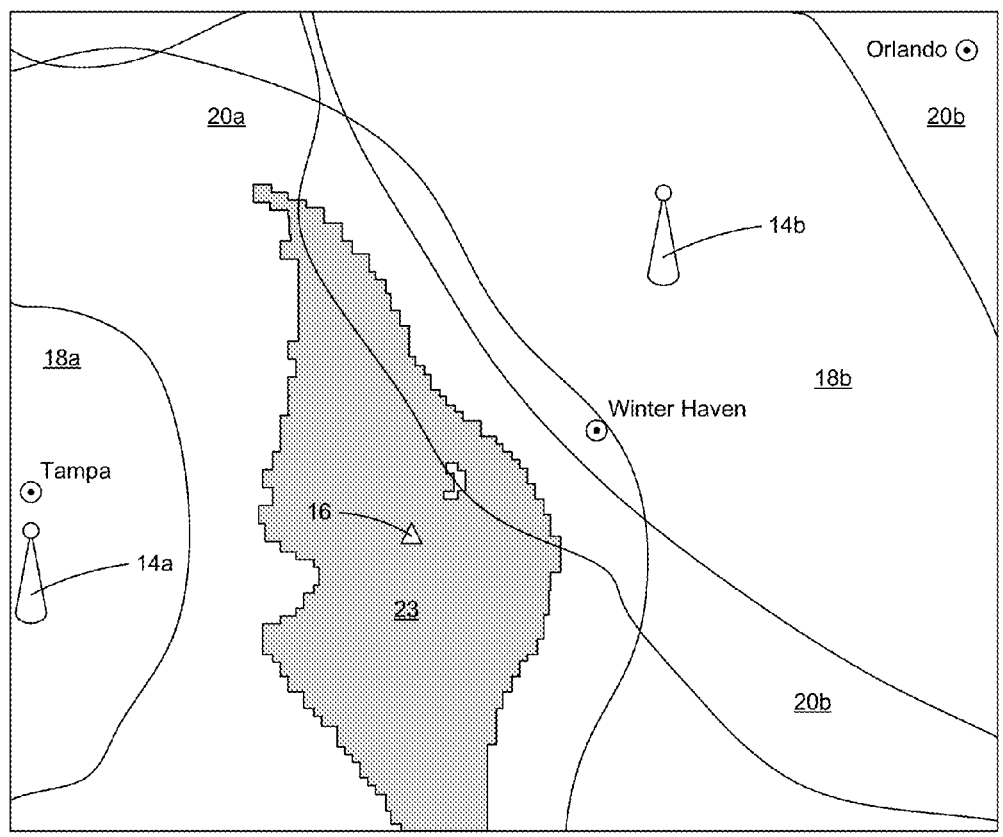
FIG. 4 is a schematic view of the effect of interference from a secondary user.

With additional reference to FIG. 4, illustrated is an exemplary spectrum environment for purposes of a descriptive example. FIG. 4 illustrates a representative geographic region between Tampa, Fla. and Orlando, Fla. For two incumbent primary users 14a and 14b that operate in the region on the same primary channel, shown are protected area contours 18a and 18b and interference protection contours 20a and 20b that respectively surround the protected area contours 18a and 18b.

Also shown in FIG. 4 is an area of predicted interference 23 from a secondary user 16. In the illustrated example, interference is quantified on a pixel by pixel basis. Each pixel represents a square mile in the representative illustration of FIG. 4. Other granulation for determining or mapping the impact of secondary use to the primary channel may be used, such as square kilometers, squares having a length and width of fifty meters, etc. Other shapes also may be used.

The presence of interference in a pixel area means that there is a quantifiable degradation to receipt of a signal from the primary user 14 in the pixel.

A predetermined threshold may be established to assess the interference to determine whether the secondary user 16 is permitted to operate in one or more of the contours of the primary user 14. The predetermined threshold may be established on a pixel by pixel basis. A value of the predetermined threshold for each pixel may be based on the type of contour overlapping the pixel. For example, the value of the predetermined threshold for a pixel overlapping the actual operating contour 22 may be set to be less tolerant of interference than the value of the predetermined threshold for a pixel overlapping the licensed coverage area 18, which may be set to be less tolerant of interference than the value of the predetermined threshold for a pixel overlapping the interference protection contour 20. These relative threshold values may be implemented to represent different levels of acceptable interference based on geographic overlap of the interference 23 to the protected use area of the primary user 14.

The value of the predetermined threshold for each pixel may be further based on other criteria. For example, if the primary user 14 has preauthorized the server 10 to grant interference rights, the primary user 14 may specify the value of the predetermined threshold for each contour type. If the primary user 14 does not specify the predetermined threshold value(s), then the server 10 may use a server-specified value for each contour type. The server-specified value for each contour type may be a default value or may be determined used one or more criteria, such as wireless application of the primary user 14, predicted number of affected users that attempt to receive the signal from the primary user 14, etc.

For pixels in which there is a quantified predicted amount of interference that operation of the secondary user 16 has on the primary channel of the primary user 14, the quantified predicted amount of interference is compared to the predetermined threshold for the pixel. As indicated, the predetermined threshold may be different for different primary users 14 and/or may be different for different types of protection contours (e.g., pixels overlapping an incumbent protection area contour 18 and pixels overlapping an interference protection contour 20 may have different predetermined thresholds). In one embodiment, the server 10 quantifies interference (e.g., the degradation of operation of the primary user 14) as a function of the rise in the induced noise floor. If the quantified predicted amount of interference for each pixel is less than the corresponding predetermined threshold for the pixel, the server 10 may authorize the secondary user 16 to operate under interference rights. But if the quantified predicted amount of interference for any one pixel is greater than the corresponding predetermined threshold for the pixel, then the server 10 may not authorize the secondary user 16 to operate under interference rights. One possible handling of this situation is for the server 10 to consider the primary channel of the primary user 14 as unavailable to the secondary user 14. Another possible outcome of this situation is for the server 10 to communicate with the primary user 14 to seek authorization for the secondary user 16 to conduct wireless communications under interference rights even though the quantified predicted amount of interference exceeded a predetermined threshold for at least one pixel.

In other embodiments, the pixel approach is not used. Rather, there may be a predetermined threshold value for each contour type (contours 18, 20 and 22) associated with the primary user 14. In this embodiment, a quantified predicted amount of interference caused by operation of the secondary user 16 is determined for areas overlapping each contour 18, 20 and 22 and these interference amounts are compared against the respective predetermined threshold values. In still another embodiment, the quantified predicted amount of interference is compared against a single threshold for the entire area of interference.

In the case where the primary user 14 has not preauthorized the server 10 to grant interference rights to a secondary user 16, the server 10 may still conduct the forgoing analysis using predetermined threshold values established by the server 10. If the quantified predicted amount of interference is less than the predetermined threshold values, then the server 10 may seek authorization to grant interference rights to the secondary user 16 from the appropriate primary user 14. In one embodiment, primary users 14 may opt-in or opt-out from being contacted by the server 10 regarding possible interference rights authorizations.

The interference may be quantified using any appropriate units. The predetermined threshold values will have corresponding units. On this basis, one test for harmful interference is to compare the total induced noise floor for the pixel from all contributors (e.g., the primary user 14 and the secondary user 16) against the predetermined threshold value for the pixel. The total induced noise floor may be measured as absolute field strength level (e.g., dBuV/m). If the total induced noise floor exceeds the threshold, then it may be concluded that harmful interference is present in an amount to preclude the automated grant of interference rights. If the total induced noise floor for the pixel does not exceed the predetermined threshold value for the pixel, then it may be concluded that harmful interference is not present and grant of interference rights is permitted so long as all other pixels have the same outcome.

Another test for the presence of harmful interference is if the signal-to-noise ratio (SNR) for the signal transmitted by the primary user in the pixel is reduced below a predetermined threshold value for the pixel. The predetermined threshold value for SNR may be selected to maintain quality of service offered by the primary user 14.

Another test for harmful interference is if the proposed secondary use would result in lost coverage that exceeds a predetermined threshold for the pixel. Lost coverage may be measured in various ways, such as a population (referred to as POPs), area, or number of receivers.

The primary use for this interference analysis is to quantify the extent and magnitude of the predicted interference. If the quantified interference is within an acceptable amount as indicated by the predetermined threshold values, then the server 10 authorizes the secondary user 16 to use spectrum under interference rights. In one embodiment, the authorization involves transmitting spectrum access credentials to use spectrum under interference rights to the secondary user 16. The secondary user 16 may receive and process the spectrum access credentials, and carry out wireless communications using the spectrum associated with the interference rights. The predetermined tolerances for interference may be defined by the primary user 14, the server 10, or in some other manner. Before engaging in wireless communications using the spectrum of a primary user 14, the secondary user 16 may be required to agree to terms and conditions placed on the spectrum use. Agreement may be performed manually, may be automated in the radio equipment of the secondary user 16, or may be made in advance.

Figure 5:
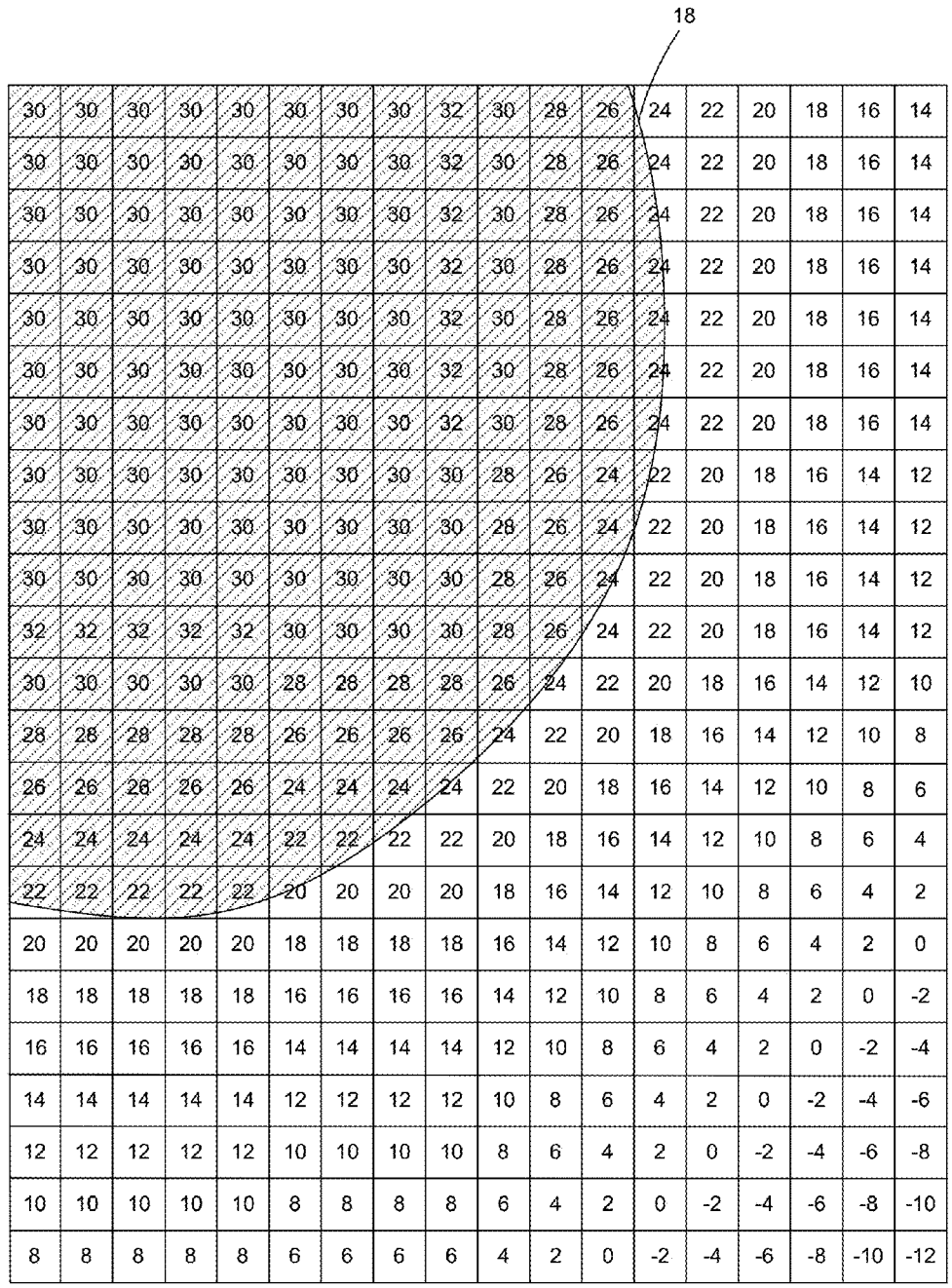
FIG. 5 is a schematic view of a representative protected contour of a primary user together with electric field strength values.

With additional reference to FIG. 5, the quantification of interference on a pixel-by-pixel basis will be described in greater detail. FIG. 5 shows a portion of an exemplary protected contour 18 and surrounding area for an incumbent user 14. For enhanced visibility, the protected contour 18 is cross-hatched in FIG. 5.

Overlaying the protected contour 18 and adjacent areas are electric field strength values for each pixel, where the electric field strength values represent the allowable electric field strength that the incumbent operator is permitted to generate under the license of the incumbent operator. The field strength values are typically derived through an understanding of the typical receive sensitivity of devices used for an authorized application falling under the primary user's license and the signal to noise/interference ratio required for usable operation. The electric field strength values associated with the primary user 14 are considered a measure of the radiation produced by the primary user 14 independent of any other transmitters.

Figure 6:
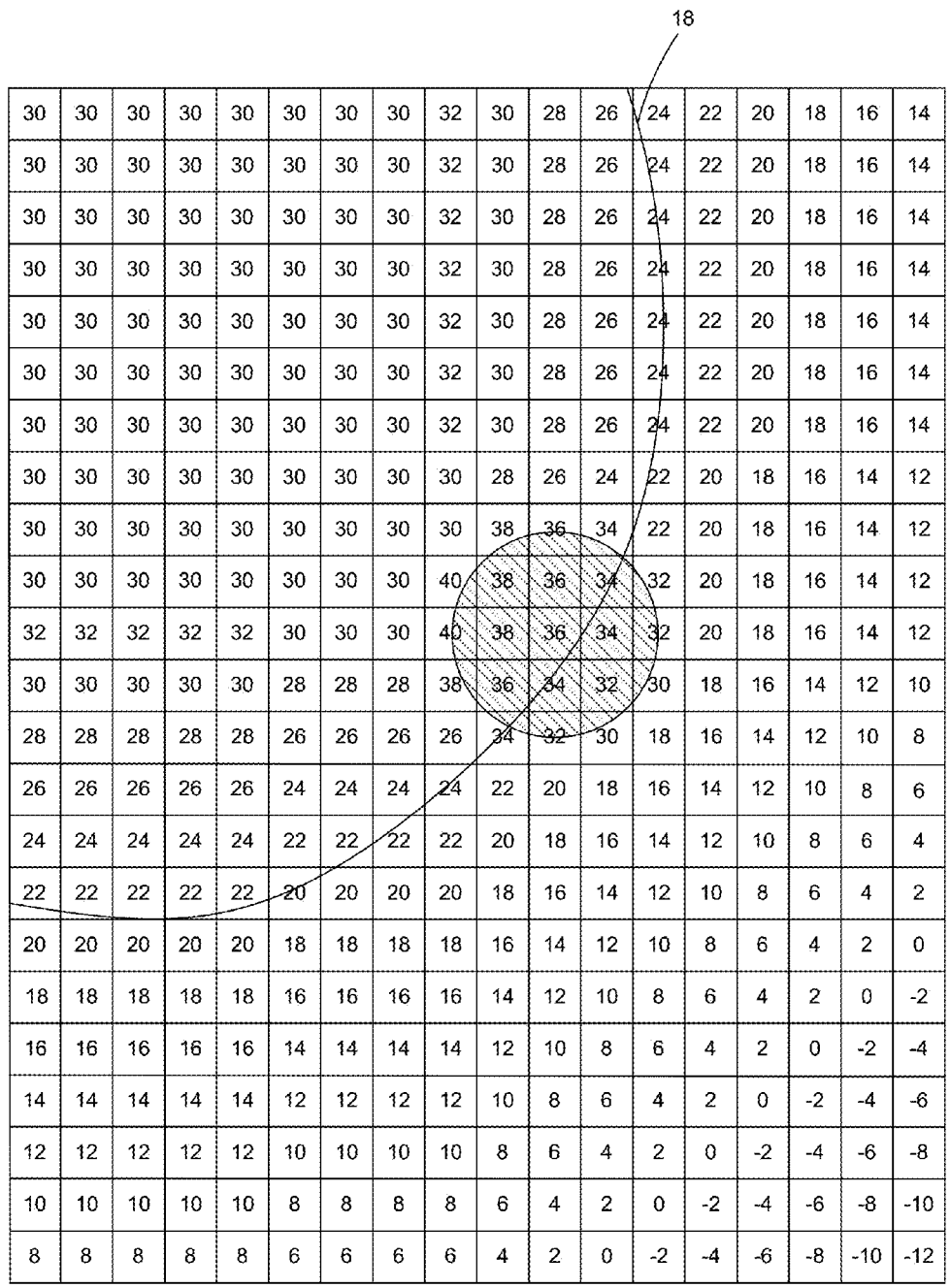

FIG. 6 shows the protected contour of FIG. 5 together with the predicted effect on the electric field strength values for presence of a secondary user 16. For enhanced visibility, the secondary use area 24 of the secondary user 16 is cross-hatched in FIG. 6.

Figure 7:
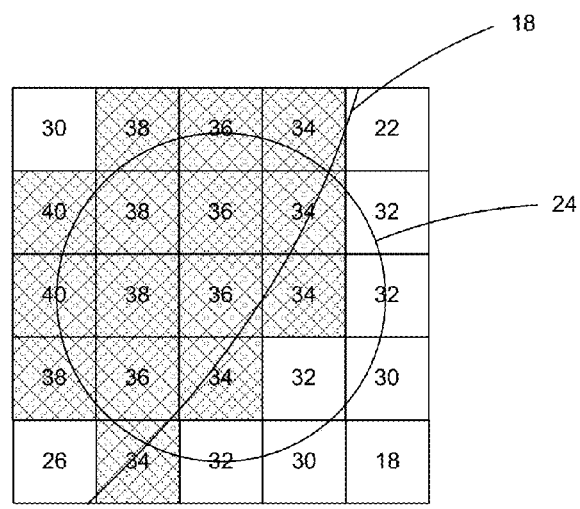
FIGS. 6 and 7 are schematic views of the effect on electric field strength values when a secondary user is introduced into the spectrum environment depicted in FIG. 5.

FIG. 7 isolates the secondary use area 24 from FIG. 6 for further enhanced visibility of the effect that the secondary user 16 has on electric field strength values.

FIGS. 6 and 7 show exemplary predicted changes in the exemplary electric field strength values of FIG. 5 if the secondary user 16 were present. Using a path loss model, the server 10 determines that—in this representative example—the proposed secondary user 16 degrades the noise floor by 10 dB (e.g., increases the electric field strength of the primary user 14 by 10 dB) in pixels overlapping with the secondary use area 24. It is noted that the effect on spectrum at various pixels may vary from pixel to pixel and need not be the same as shown the illustrated example. Fifteen of the pixels in which noise floor is degraded are at least partially within the protected area 18. For enhanced visibility, the pixels that are predicted to experience a change in noise floor and that overlap the protected area 18 are cross-hatched in FIG. 7.

In one embodiment, the server 10 evaluates the effect of the secondary user 16 on a pixel-by-pixel basis. If the effect at any one pixel is considered excessively harmful to the operations of the primary user 14 (e.g., the interference passes the predetermined threshold for the pixel), then interference rights are not automatically granted to the secondary user 16 by the server 10. As indicated, however, the primary user 14 may approve the interference rights even if the objective comparison to the threshold values fails. Also, in one embodiment, if characteristics of the secondary user 16 may be changed (e.g., transmit power reduced) to avoid excessively harmful interference, then the analysis may be conducted with the modified characteristics of the secondary user 16.

The criteria for harmful interference may be different for pixels in or overlapping with the various contours 18, 20, 22 of the primary user 14. For a pixel that overlaps the secondary use area 24 and the operating contour 22 (FIG. 2), a lower amount of quantifiable degradation of operation of the primary user 14 may be tolerated than for a pixel that overlaps the secondary use area 24 and the protected area 18. Similarly, for a pixel that overlaps the secondary use area 24 and the protected area 18, a lower amount of quantifiable degradation of operation of the primary user 14 may be tolerated than for a pixel that overlaps the secondary use area 24 and the interference protection contour 20 (FIG. 2). Therefore, the threshold for pixels overlapping the protected area 18, the threshold for pixels overlapping the protection contour 20 and the threshold for pixels overlapping the operating contour 22 may be separately established to control the allocation of interference rights.

Another use for the quantification of interference is to place a value on the interference. The value may be monetary and may represent the amount of money that the secondary user 16 is charged for the interference rights. The money charged to the secondary user 16 may be owed to the primary user 14. In one embodiment, the server 10 performs a clearing house function for payment of such charges. Additionally, the operators of the server 10 may charge a commission based on the monetary value of the interference rights or charge a service fee to one or both of the secondary user 16 or the primary user 14. Example metrics used to convert interference to a monetary value include, but are not limited to, a unit price per (increase in dB)/Hz/area/time or a unit price per (increase in dB)/Hz/POP/time.

Assuming that the quantified interference for each pixel is within acceptable tolerances, and any other additional conditions on the use of spectrum licensed to the primary user 14 are met, the secondary user 16 will be granted interference rights. As indicated, one possible condition on the use of spectrum licensed to the primary user 14 may be payment by the secondary user 16. As an example, it will be assumed that the monetary price for interference rights is established to be $0.10/(increase in dB)/MHz/SqMi/day. In furtherance of the example, each pixel is 1 square mile and each pixel that is partially in the protected contour is considered for purposes of price calculation to be entirely within the protected contour. Under these conditions, using the example of FIGS. 5-7 and if the request by the secondary user 16 is for a 6 MHz channel, then the cost to the secondary user 16 would be $0.10×10 dB×6 MHz×15 square miles per day, which equals $90.00 per day.

In the foregoing example, the effect on noise floor is the same for each pixel affected by the secondary user 16 (e.g., 10 dB). In cases where the effect on noise floor is not the same for each affected pixel lying at least partially in the protected contour, the equation for computing cost of use may be separately solved for each affected pixel lying at least partially in the protected contour and those results may be summed. Alternatively, a constant dB value (e.g., a fixed value, such as 10 dB, or an average of the changes in electric field strength for the affected pixels) may be used for each affected pixel lying at least partially in the protected contour even though predicted changes in electric field strength may vary from pixel to pixel.

The monetary value of secondary use or way of calculating the monetary value of secondary use (e.g., rate or unit price per metric set) may be established by the primary user 14 or may be established automatically by the server 10 giving consideration to market forces. In some cases, the primary user 14 will be a private entity that sets or accepts the monetary value for the interference rights described herein. In other cases, the primary user 14 may be a government agency. The described techniques enable an economic model under which the value of spectrum use can be quantified. If the economic value in the spectrum to commercial interests is higher than commercial interests would otherwise pay the government to temporarily vacate the spectrum under a rent or lease payment, then the disclosed interference rights approach could be pursued by the government to support commercial radio-based services.

If predicted interference cannot be quantified or if the interference exceeds predetermined limits that would allow the server 10 to automatically grant spectrum access to the secondary user 16, then the request from the secondary user 16 may be manually reviewed by the primary user 14. Following this review, and if the primary user 14 accepts the requested secondary use, spectrum access may be granted to the secondary user 16. The spectrum access under these conditions may have a higher cost and/or restrictive conditions on spectrum use by the secondary user 16 may be imposed.

The disclosed techniques create a secondary market for licensed spectrum where none existed in the past. Under normal operation of a TVWS device (a secondary user) at a specified location, a channel licensed by a primary user 14 would not be made available to the TVWS device. But using the disclosed evaluation and authorization process, the server 10 will be able to identify instances where licensed spectrum may be used by the TVWS device. As mentioned, the disclosed techniques may be extended to other spectrum in addition to or instead of TVWS.

In one embodiment, the process of granting interference rights for certain secondary users 16 may be expedited. For example, secondary users 16 having a fixed location and known operating or transmission characteristics may be eligible for expedited handling. In this case, the server 10 stores data to recognize a request as coming from a known secondary user 16 having a fixed location. The recognition may be made using a unique identifier for the secondary user, such as a user identification and a unique equipment ID value or a unique radio device serial number. Alternatively, the secondary user may possess preapproved credentials for obtaining interference rights. Once the identity of the secondary user 16 has been validated and the location of the secondary user 16 has been confirmed, then the secondary user 16 may receive permission to operate in the primary user's channel based on predetermined parameters concerning broadcast characteristics. In this embodiment, a policy has been provisioned by the primary user 14 that permits predetermined users or devices (or classes of users or device) to have access to otherwise protected spectrum under certain conditions. In some embodiments, there may be exclusions to the policy so that the interference rights are not granted at certain times.

Conditions may be imposed on the secondary user 16 as a requirement for receiving interference rights. Conditions may be imposed regardless of whether the grant is made though the foregoing policy-based approach or by way of the above-described quantification process. The conditions may be dictated by the license holder (the primary user 14), by regulation, or other by a party supervising the process (e.g., the operator of the server 10). For example, the interference rights may be restricted by one or more of time (e.g., a specified time duration, time of day, day of week, etc.), specified geography (e.g., portions of the protected boundary area are available or unavailable), certain frequencies (e.g. all channels falling within the primary user's license or only specified channels falling within the primary user's license), broadcast power, wireless application, modulation scheme, etc.

If more than one secondary user 16 seeks interference rights that overlap with the boundary 18, 20 and/or 22 of the primary user 14, then the grant of additional spectrum access may be bound by one or more considerations. For example, grants may be made on relative priority of the secondary users 16, relative priority of the types of radio devices operated by the secondary users 16, relative priority of wireless applications of the secondary users 16, etc. In another embodiment, the priority user 14 may set a limit on the number of secondary users 16 or devices that are afforded access. Additionally, thresholds may be defined that impose various limits on use by secondary users 16. One exemplary limit is a maximum geographic area that is allowed to be affected by secondary users 16. Another limit may be a maximum monetary price that each secondary user 16 may be charged when there is more than one secondary user 16 that overlaps in geographic area.

In most instances, a secondary user 16 that conducts wireless communications using spectrum of a primary user 14 under interference rights may expect better quality of access than if unlicensed spectrum were used. This is because there is an intrinsic level of exclusivity to the spectrum of the primary user 14 that is not encountered with unlicensed spectrum where the user is required to be tolerant of other coexisting unlicensed secondary users.

In one embodiment, the secondary user 16 may be given the option to use unlicensed spectrum (e.g., select a TVWS channel) or use licensed spectrum under interference rights. In practice, the secondary user 16 may be provided with a channel list that identifies a "special access channel" (i.e., the channel of a primary user on which the secondary user may conduct wireless communications under interference rights) in addition to other channels (e.g., unlicensed or shared access channels, such as TVWS). Any costs associated with the special access channel may be displayed or entered into an automated decision making engine. Then, the device or operator may decide which channel to use. Decision making processes that may be adapted for this purpose are disclosed in U.S. Pat. No. 8,279,823, the disclosure of which is herein incorporated by reference in its entirety.

If unlicensed spectrum is congested or unavailable, then the licensed spectrum may be a better choice to deliver a high level of service even though there may be a monetary cost. On the other hand, if unlicensed spectrum that may deliver a high quality of access is available, then the unlicensed spectrum may be a better choice since unlicensed spectrum typically does not have any monetary costs associated with use of the unlicensed spectrum. In one embodiment, the secondary user 16 may be provided with additional information about each possible channel to assist in guiding the decision. For instance, the available unlicensed channels and licensed channels each may be reported with feedback (e.g., a score) that reflects predicted quality of service on the channel based on factors such as interference, congestion, RF metrics and relative exclusivity/coexistence. Ranking and scoring techniques that may be adapted for this purpose are disclosed in U.S. Pat. No. 8,532,686, the disclosure of which is herein incorporated by reference in its entirety.

To improve the decision making process by plural secondary users 16, and to keep primary users 14 informed of any secondary users 16 that operates under interference rights, the secondary users 16 may be requested or required to share channel use selections with the server 10. This information may be passed to appropriate primary users 14. Also, this information may be used by the server 10 to generate appropriate information about the predicted quality of the various channels in future-generated channel lists.

C. System Architecture

It will be understood that some of the tasks described in this document are carried out by an electronic device of the secondary user 16, some of the tasks described in this document are carried out by an electronic device of the primary user 14, and some of the tasks are carried out by a spectrum management server 10. Tasks carried out by each device respectively may be considered a method carried out by that device. For these purposes, each of these devices includes appropriate control circuitry and/or processors and memory components. Logical instructions to carry out the respective processes may be embodied as software that is executed by the relevant device and that is stored on a non-transitory computer readable medium (e.g., computer memory) of the relevant device. Also, communications between the devices may be through any appropriate medium, such as one or more of the Internet, a cellular network, a WiFi network, etc.

FIG. 1 is a schematic block diagram of an exemplary system for implementing the disclosed techniques. The secondary user 16 may be or may include any type of electronic device that engages in wireless communications, such as a mobile phone, a computing device, an information and/or entertainment system, a modem and router for providing Internet connectivity to other devices, etc. The server 10 communicates with the secondary user 16 and other devices (e.g., the primary user 14) over any appropriate communications medium 12, such as one or more of the Internet, a cellular network, a WiFi network, etc. The server 10 may be a central white space registration system or some other form of spectrum management platform.

The secondary user 16 is location aware. For instance, the secondary user 16 may be capable of determining its position (also referred to as geo-location) using a location-determining technique, such as GPS or other technology. In some embodiments, the secondary user 16 may have a GPS receiver that is used to receive GPS satellite signals from which position coordinates are triangulated. Furthermore, the secondary user 16 may be moveable and capable of manually or autonomously updating its determined position as it moves.

The secondary user 16 includes communications circuitry, such as radio circuitry 26. The radio circuitry 26 may include one or more radio modems (e.g., radio transceivers) and corresponding antenna assemblies to allow for communications over various types of network connections and/or protocols. The radio circuitry 26 may be used to carry out various wireless communications functions, including communicating with the server 10. The communications functions may include, but are not limited to, engaging in voice or video calls, and sending or receiving messages (e.g., email messages, text messages, multimedia messages, instant messages, etc.), accessing the Internet, transferring data (e.g., streaming video, obtaining or sending files), etc.

Overall functionality of the secondary user 16 may be controlled by a control circuit that includes a processing device 28. The processing device 28 may execute code that is stored in a memory 30. For instance, the processing device 28 may be used to execute an operating system and other applications that are installed on the secondary user 16. The operating system or applications may include executable logic to implement the functions of the secondary user 16 that are described herein.

The memory 30 is a non-transitory computer readable medium and may be, for example, one or more of a buffer, a flash memory, a hard drive, a removable media, a volatile memory, a non-volatile memory, a random access memory (RAM), or other suitable device. In a typical arrangement, the memory 30 includes a non-volatile memory for long term data storage and a volatile memory that functions as system memory for the control circuit.

The secondary user 16 may include any other appropriate components such as, but not limited to, a display, a speaker, a microphone, a user interface (e.g., a keypad and/or a touch-sensitive input), motion sensors, etc.

The server 10 may be implemented as a computer-based system that is capable of executing computer applications (e.g., software programs), including a spectrum management function 32 that, when executed, carries out functions of the server 10 that are described herein. The spectrum management function 32 and a database 34 may be stored on a non-transitory computer readable medium, such as a memory 36. The database 34 may be used to store various information sets used to carry out the functions described in this disclosure. For instance, the server 10 may store or access data about known protected radio devices. The memory 36 may be a magnetic, optical or electronic storage device (e.g., hard disk, optical disk, flash memory, etc.), and may comprise several devices, including volatile and non-volatile memory components. Accordingly, the memory 36 may include, for example, random access memory (RAM) for acting as system memory, read-only memory (ROM), solid-state drives, hard disks, optical disks (e.g., CDs and DVDs), tapes, flash devices and/or other memory components, plus associated drives, players and/or readers for the memory devices.

To execute logical operations, the server 10 may include one or more processors 38 used to execute instructions that carry out logic routines. The processor 38 and the memory 36 may be coupled using a local interface 40. The local interface 40 may be, for example, a data bus with accompanying control bus, a network, or other subsystem.

The server 10 may have various input/output (I/O) interfaces for operatively connecting to various peripheral devices, as well as one or more communications interfaces 42. The communications interface 42 may include for example, a modem and/or a network interface card. The communications interface 42 may enable the server 10 to send and receive data signals, voice signals, video signals, and the like to and from other computing devices via an external network. In particular, the communications interface 42 may operatively connect the server 10 to the communications medium 12.

In one embodiment, the server 10 may be configured to host the above-described services for a plurality of electronic devices, including the secondary user 16. In some embodiments, the services may include spectrum management functions, such as providing channel lists and/or interference rights to qualified radio devices upon registration so as to allow the radio devices to make use of spectrum for wireless communications. Also, while the providing of services may be fully automated, the server 10 may host an Internet-style website for the various corresponding parties to conduct initial enrollment with the server 10, conduct manual registration if needed, access various tools and reports supplied by the server 10, and so forth. For supplying the services, the server 10 may collect spectrum usage information from various sources, including but not limited to public databases, private databases and deployed radio devices (e.g., in the form of channel use selections or spectrum sensing results). The database information may contain information about known spectrum users, such as incumbent spectrum users (e.g., digital television stations, wireless microphone systems, cable head end systems, FM radio stations, etc.), licensed spectrum users, or radio systems that are exempt from seeking channel map information in order to operate.

Aspects of the disclosed systems and methods are independent of the type or types of devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum, including but not limited to shared spectrum environments such as white spaces (e.g., TV white spaces or TVWS) where available channels are interleaved with licensed channels. Furthermore, the methods and systems are generic to modulation schemes, harmonic considerations, frequency bands or channels used by the electronic device, the type of data or information that is transmitted, how the electronic device uses received information, and other similar communications considerations. Thus, the systems and methods have application in any suitable environment.

In embodiments in this disclosure, the server may undertake spectrum management functions other than those that are described in detail, such as responding to white space channel list requests with appropriate channel lists. Therefore, in some embodiments, the server may be considered a central spectrum "database" or white space registration/allocation system.

D. Conclusion

Although certain embodiments have been shown and described, it is understood that equivalents and modifications falling within the scope of the appended claims will occur to others who are skilled in the art upon the reading and understanding of this specification.

What is claimed is:

1. A spectrum management server, comprising:
    a communications interface over which communications with a secondary user of spectrum are made, the secondary user having a need for spectrum access to carry out wireless communications and the communications including receiving a spectrum access request from the secondary user; and
    a processor that executes logical instructions to configure the spectrum management server to:
    determine a primary user that has a protected use area that overlaps with a secondary use area of the secondary user;
    divide the protected use area of the primary user into geographic pixels of predetermined area, each pixel being located within or overlapping with at least one geographic contour and having a corresponding predetermined limit for interference under which operation of the secondary user is tolerable, wherein a value of the corresponding predetermined limit for interference is based at least in part on a protection level associated with an innermost contour of the at least one geographic contour;
    for each pixel having overlap between the protected use area and the secondary use area, determine a quantified predicted amount of interference that operation of the secondary user has on a primary channel of the primary user;

authorize spectrum access to the primary channel of the primary user under interference rights to the secondary user if the quantified predicted amount of interference for each pixel having overlap between the protected use area and the secondary use area does not exceed the corresponding predetermined limit for interference; and communicate the spectrum access to the secondary user.

2. The spectrum management server of claim 1, wherein the quantified predicted amount of interference is determined by applying a propagation model to the operation of the secondary user.

3. The spectrum management server of claim 2, wherein the quantified predicted amount of interference is expressed as an induced rise in noise floor.

4. The spectrum management server of claim 1, wherein each predetermined limit for interference is determined as a function of induced noise floor caused by operation of the primary user and the quantified predicted amount of interference.

5. The spectrum management server of claim 1,
wherein each predetermined limit for interference is a function of total induced noise floor from at least the primary user and the secondary user.

6. The spectrum management server of claim 1, wherein each predetermined limit for interference is a function of signal-to-noise ratio for a signal of the primary user.

7. The spectrum management server of claim 1, wherein each predetermined limit for interference is a function of loss of service to primary user operation.

8. The spectrum management server of claim 1, wherein the primary user grants preauthorization for the spectrum management server to authorize spectrum access to the primary channel of the primary user under interference rights.

9. The spectrum management server of claim 1, wherein the spectrum management server determines a value of the interference rights as a function of the quantified predicted amount of interference that operation of the secondary user has on the primary channel of the primary user.

10. The spectrum management server of claim 1, wherein the processor executes logical instructions to configure the spectrum management server to:
expedite authorization of spectrum access to the primary channel of the primary user under interference rights to the secondary user based at least in part on the secondary user having a fixed location or known operating or transmission characteristics, or both.

11. A method of granting interference rights to a secondary spectrum user that has a need for spectrum access to carry out wireless communications, comprising:
receiving a spectrum access request from the secondary user;
determining a primary user that has a protected use area that overlaps with a secondary use area of the secondary user;
dividing the protected use area of the primary user into geographic pixels of predetermined area, each pixel being located within or overlapping with at least one geographic contour and having a corresponding predetermined limit for interference under which operation of the secondary user is tolerable, wherein a value of the corresponding predetermined limit for interference is based at least in part on a protection level associated with an innermost contour of the at least one geographic contour;
for each pixel having overlap between the protected use area and the secondary use area, determining a quantified predicted amount of interference that operation of the secondary user has on a primary channel of the primary user;
authorizing spectrum access to the primary channel of the primary user under interference rights to the secondary user if the quantified predicted amount of interference for each pixel having overlap between the protected use area and the secondary use area does not exceed the corresponding predetermined limit for interference; and
communicating the spectrum access to the secondary user.

12. The method of claim 11, wherein the quantified predicted amount of interference is determined by applying a propagation model to the operation of the secondary user.

13. The method of claim 12, wherein the quantified predicted amount of interference is expressed as an induced rise in noise floor.

14. The method of claim 11, wherein each predetermined limit for interference is determined as a function of induced noise floor caused by operation of the primary user and the quantified predicted amount of interference.

15. The method of claim 11, wherein each predetermined limit for interference is a function of total induced noise floor from at least the primary user and the secondary user.

16. The method of claim 11, wherein each predetermined limit for interference is a function of signal-to-noise ratio for a signal of the primary user.

17. The method of claim 11, wherein each predetermined limit for interference is a function of loss of service to primary user operation.

18. The method of claim 11, further comprising determining a value of the interference rights as a function of the quantified predicted amount of interference that operation of the secondary user has on the primary channel of the primary user.

19. The method of claim 11, further comprising:
expediting authorization of spectrum access to the primary channel of the primary user under interference rights to the secondary user based at least in part on the secondary user having a fixed location or known operating or transmission characteristics, or both.

20. An electronic device, comprising:
radio circuitry configured to engage in wireless communication, the radio circuitry relying on spectrum access provided by a spectrum management server to carry out the wireless communications; and
control circuitry configured to request spectrum access from the spectrum management server and process spectrum access credentials received from the server, the processing of the spectrum access credentials including selecting between spectrum access to unlicensed spectrum and spectrum access under interference rights to a primary channel of a licensed primary user of spectrum based at least in part on a cost of the interference rights, wherein the cost is a function of a quantified predicted amount of interference that operation of the secondary user has on the primary channel of the primary user, and wherein the processing of the spectrum access credentials further comprises expediting authorization of spectrum access to the primary channel of the primary user under interference rights to the secondary user based at least in part on the secondary user having one or more of a fixed location, known operating characteristics, or known transmission characteristics.

\* \* \* \* \*